Patented Oct. 25, 1938

2,134,158

UNITED STATES PATENT OFFICE 2,134,158

INSECTICIDAL OIL COMPOSITIONS

William Hunter Volck, Watsonville, Calif., assignor to California Spray-Chemical Corporation, Berkeley, Calif., a corporation of Delaware No Drawing. Application February 13, 1935, Serial No. 6,391

9 Claims. (Cl. 167—43)

The present invention relates to new and improved insecticidal oil compositions and more particularly to insecticidal oil compositions which are easily dispersed in water by mechanical agitation and which are therefore especially adapted to the so-called "tank-mix" or "in-the-field" method of preparing insecticidal oil emulsion sprays and to a method of producing the same.

This invention is a continuation in part of the disclosure in my copending application, Serial Number 733,251, filed June 30, 1934, now issued as United States Patent No. 2,109,095.

Numerous so-called "soluble" or "miscible" oils have in the past been prepared for various uses among which is their use in insect control work. Such oils have possessed the common property of spontaneous dispersion on contact with water or at least of being readily dispersed when vigorously agitated with water. Oils so prepared for insecticidal use have thus been self-emulsifying to the extent that they might have been, and sometimes were, employed as tank-mix oils for the preparation of insecticidal sprays at the point of actual application.

It is a fact, however, that the oil-soluble materials which have been employed as "internal emulsifiers" in the preparation of soluble oils have usually been of such character as to make even the most phytonomic oils destructively harmful to growing vegetation when the emulsifiers have been used in quantity sufficient to render the oil self-emulsifying to a useful degree. Use of the well known soluble oils in insecticidal spray preparation has therefore received but little favorable consideration.

A step in the direction of a really satisfactory tank-mix insecticidal oil composition was made with the discovery of the class of oil soluble "polar" emulsifiers described in U. S. Patent #1,707,469, issued April 2, 1929 to Hugh Knight. While the specific internal emulsifiers therein disclosed are much less phytocidal than are the oil-soluble emulsifiers which had been previously used they have generally failed of widespread utilization because they imparted emulsifiability to the oil in insufficient degree, they were too critical in operation or they were uneconomical.

It is the broad object of this invention to provide an insecticidal oil composition for tank-mix spray preparation which shall have none of the foregoing defects and which shall have certain functions, desirable in insecticidal oil sprays, in addition to ready dispersibility.

I have discovered that certain of the oil-soluble alkali sulfonates resulting from the refining or treatment of petroleum distillates or extracts therefrom may, when properly purified and neutralized, be used in relatively small amounts as internal emulsifiers in insecticidal petroleum oils for the preparation of dormant or winter sprays and in still smaller amounts, in combination with substances which may be referred to as interfacial tension modifiers, in the production of readily emulsible insecticidal oils of wide applicability and very great utility.

While some attempts have hitherto been made to utilize oil-soluble petroleum sulfonates in the preparation of self-emulsifying oils for insecticidal use such attempts have, so far as I am aware, met with little if any commercial success. When used alone such sulfonates are required in amounts of 20% to 40% by weight relative to the oil in order to render a phytonomic oil self-emulsifying. Such high percentages are, as might be expected, decidedly harmful to growing vegetation and therefore could be used only in sprays for application to dormant vegetation and even then only with considerable risk of causing serious damage. So far as the literature on the subject discloses and so far as my experience goes, oil solutions of materially lesser amounts of petroleum sulfonates have hitherto found no utility in the absence of water-soluble emulsifiers adequate in themselves to effect emulsification.

In carrying out my invention I employ the oil-soluble sulfonates produced from petroleum distillates in the boiling range of heavy kerosenes, mineral seal oils, or light to medium lubricating oils, i. e., oils of molecular weight from about 200 to 400 or above. These sulfonates as produced or usually after careful neutralization are dissolved in the desired phytonomic oil in relatively small proportions, always less than 10% and usually less than 1% by weight. For the preparation of a general utility composition for summer spray work from 0.4% to about 0.8% will, when used as hereinafter directed, be found to give good results. For winter or dormant sprays from 3% to about 10% may be used if desired.

Oils containing very low percentages of sulfonates for instance below about 3% by weight have been found to be substantially harmless to growing vegetation when the oil is applied with 95-99 parts of water. As such they are, however, not self-emulsifying to any useful degree and it is at this point that the present invention had its beginning.

It was first found that certain simple organic liquids which are both oil-soluble and water-soluble to a considerable degree are particularly useful in rendering oils containing very low concentrations of alkali petroleum sulfonates easily dispersible in water which contains no additional emulsifier of any sort. Certain low molecular weight ketones, alcohols, aldehydes, esters, ethers, amines, amides and the like having an appropriate coefficient of distribution between oil and water are effective in this respect. From this group the individual compound which was found to combine the highest degree of efficacy and economy with the most ready availability was dimethyl ketone: ordinary acetone.

The quantity of such third ingredient which it was found necessary to use in order to secure ready mechanical dispersibility of oils containing a few tenths of one percent of petroleum sulfonates resulting in adequately stable emulsions for tank-mix spray preparation was in general surprisingly small. In the case of acetone, 0.25% by volume on the basis of the oil used produced a marked effect and 1.0% produced ready dispersibility adequate for any tank-mix operation though so far as has yet been found, larger amounts may be employed, if desired, without harmful effect.

It was next found that by employing as the interfacial tension modifier in such compositions certain substances the molecules of which are in general somewhat more complex, other desirable characteristics in addition to ready mechanical dispersibility may be imparted to oils for use in tank-mix spray preparation. Two characteristics in particular, which have for some time been recognized as desirable in any oil emulsion or dispersion spray for insecticidal use may be readily realized by the proper choice of such modifying agents.

As has often in the past been pointed out, the leaves and fruit which it is most often desired to treat for insect control as well as most insects themselves are more readily wetted by oil than by water and hence to secure worth while results through the application of a dispersion of oil-in-water the function of oil-wetting must be present to a considerable degree. To this end various spreaders have been incorporated in the standard insecticidal oil emulsions of commerce while the emulsions have further been rendered "quick-breaking" as far as possible consistent with the conditions of storage and handling. Both such expedients have to a certain degree been carried over into the field of tank-mix operation, but even at best such dispersions have seldom been satisfactorily oil-wetting.

I have now found, however, that certain of the substances which I have tested as interfacial tension modifiers for use in oils containing the vary small percentages of alkali petroleum sulfonates hereinabove disclosed are capable of imparting the characteristic of oil-wetting to tank-mix sprays prepared from such compositions and carrying the customary 1–4% of oil, to a remarkable and highly satisfactory degree. I have further observed that mechanical dispersions of such oil compositions, even when prepared by mild shaking of the usual proportions of oil and water in a closed flask or bottle, invariably form a certain proportion of invert (water-in-oil) emulsion and it is apparently to this new phase, which is inherently oil-wetting, that the superior oil-wetting characteristics realized in my new tank-mix sprays is to be attributed.

The second desirable characteristic of oil dispersion sprays which I have found to be realizable through proper choice of materials, to be used as interfacial tension agents, is somewhat more difficult either to evaluate or to explain but is none the less real and is much prized by the practical spray operator.

The usual fine, stable, dilute, emulsions prepared as in the past by diluting a concentrated stock emulsion are referred to by such men as "dead" and are held in less esteem because of their deadness. On the other hand "liveness", which is more or less synonymous with "frothiness", has been much sought after in insecticidal oil dispersions though it has been infrequently and undependably realized, such live emulsions as have been known having resulted more by accident than by design.

In testing various materials as interfacial tension modifiers in oil-sulfonate compositions for use in tank-mix spray preparation certain ones were found which gave not only easy dispersibility and superior oil-wetting as hereinabove described but in addition imparted liveness or frothiness to the dispersion in very marked degree.

The over-all result of these several discoveries is therefore that by dissolving a relatively very small quantity of petroleum sulfonic salt and an equally small or even smaller amount of another material, selected as hereinafter disclosed, in any desired insecticidal petroleum oil a composition results from which insecticidal sprays with a novel and highly desirable combination of characteristics may be produced by the now widely used tank-mix method.

While a considerable number of materials have been tested in the capacity of interfacial tension modifiers for this use only the broadest of generalizations are yet possible as to the molecular structure or configuration which is responsible for each of the characteristics just enumerated. In general the simple, low molecular weight, aliphatic alcohols, aldehydes, ketones, etc., of appropriate oil-water solubility appear to influence primarily ease of dispersion while certain substances containing an aromatic or hydroaromatic nucleus with one or more polar groups and one or more aliphatic groups attached are able in addition to contribute frothing and/or oil-wetting apparently depending upon the number, position and identity of the groups attached to or closely surrounding the ring.

Aromatic nuclei having from one to four carbon atoms in side chains and an (OH) radical as the polar group appear more likely to contribute both oil-wetting and frothing to a desirable degree than other combinations which have been tried. Where the (OH) radical is in the single side chain as in benzyl alcohol the frothing effect predominates while when no aliphatic substituent is present and in its stead a second aromatic nucleus is attached to the ring carrying the (OH) group as in $\beta$-naphthol or p-hydroxy diphenyl invert emulsion formation and oil wetting is the predominating effect.

The following table includes a number of compounds which have been found to possess particularly interesting characteristics in this connection. While results are given only in qualitative terms they serve to indicate the relation of activity to molecular structure. The tests were performed in the laboratory as follows: 1% by volume of neutralized petroleum sulfonate was dissolved in a medium phytonomic oil and then modifier to the extent indicated in the table was added. For parts of the resulting mixture and ninety-six parts of tap water were then hand shaken in a stoppered bottle and the observations taken. The check sample contained sulfonate but no modifier.

polar groups similarly placed, result in very similar emulsions.

When all of the factors of operation are combined and the over-all utility of the better compositions tested in producing desirable tank-mix

*Table of results*

| Modifier | Concentration | Easy of dispersion | Invert formed | Live emulsion | Oil-globules stick to glass | Indicate good tank-mix |
|---|---|---|---|---|---|---|
| None | | No | Poor (tenacious) | No | Yes | No. |
| Acetone | ½% | Yes | | No | Yes | Fair. |
| Do | 1% | Very | | No | Yes | Yes. |
| β-naphthol | 0.1% (sat'd.) | Yes | Yes | Yes | No | Yes. |
| Thymol | 1% | Yes | Yes | Fair | No | Yes. |
| Orcinol | Saturated | Yes | No | Yes | | Yes. |
| Menthol | 1% | Yes | Yes | Very | | Fair. |
| p-Cresol | ½% | Yes | Yes | Yes | No | Yes. |
| S. D. pine oil | 1% | Fair | Fair | Yes | No | Yes. |
| β-naphthyl-methyl ether | 1% | Yes | Fair | Yes | No | Yes. |
| Benzyl alcohol | 2% | Very | Little | Very | | |
| Fenchyl alcohol | 1% | Yes | Yes | Yes | No | Fair. |
| p-OH-diphenyl | Saturated | Fair | Much (tenacious) | Fair | No | No. |
| 4-OH-1-3-Me-benzene | 1% | Yes | Yes | Fair | Yes | Fair. |
| p-NO₂-toluene | 1% | Fair | Yes | | Yes | No. |
| Di-o-tolyl-thiourea | Saturated | Fair | Poor (tenacious) | Yes | | No. |
| α-Naphthylamine | | | Fair | Yes | | No. |
| Methyl oxalate | 1% | Fair | | Poor | | No. |
| Cresylic acid | ½% | Yes | Yes | Yes | No | Yes. |

While the check oil, without modifier, could be made to produce some invert emulsion neither the oil nor the invert, when formed, was sufficiently readily dispersible for use as a tank-mix spray. This same lack of dispersibility on the part of the invert emulsion, referred to in the foregoing table of results as tenacity, was also experienced with several of the modifiers tested. It is not surprising to find that modifiers which imparted only fair dispersibility to the oil itself were likely to permit a tenacious, curd-like layer of invert to form and persist even on vigorous shaking.

The fact as to whether, after shaking a given test sample as previously described, the oil was observed to adhere to the inside walls of the bottle has been recorded in column seven of the foregoing table. Without attempting any explanation of why it should be so, it was found that only those compositions which did not permit the oil to stick to the glass gave a live dispersion containing easily dispersible invert emulsion and a desirable degree of oil-wetting by the spray as a whole.

The delicacy of the dispersion systems with which we are here dealing is rather forcefully indicated by the fact that one-half percent of pure p-cresol is inferior as a modifier to one-fifth percent of commercial cresylic acid. When such differences in effectiveness are found to exist between a pure compound and a mixture of its isomers it should not be surprising to find very considerable differences between different compounds whose molecules are apparently very similar. In general, however, closely similar molecules appear to give results which are hard to distinguish, one from the other, by purely qualitative tests. This is substantiated by the results obtained with the four substances thymol, menthol, fenchyl alcohol and terpineol (the major constituent of steam distilled pine oil) which, while they contain the six membered carbocyclic ring structure common to all substances shown by the foregoing table to give the desired combination of effects, differ as widely among themselves in the specific nature of that ring structure as any materials studied and yet, having identical or closely similar attached aliphatic carbon and sprays is appraised without regard to the comparative cost of materials the foregoing modifiers are found to fall in substantially the following order: cresylic acid, steam distilled pine oil, β-naphthol, thymol, menthol, β-naphthyl-methyl ether and p-hydroxy diphenyl.

Since several characteristics are being sought after in the finished spray and since the various modifiers appear to contribute such characteristics to different degrees it is entirely logical to expect that the correct combination of two or more modifiers might give a better result than any one alone. This has been found to be the fact. The combination of cresylic acid and pine oil is a good example. Other combinations such as acetone or benzyl alcohol with p-hydroxy diphenyl or β-naphthol are worthy of mention.

The following examples of readily dispersible oils for tank-mix insecticidal spray preparation are typical of my preferred compositions:

*Example 1*

| | Percent |
|---|---|
| Insecticidal mineral oil (medium) | 99.0 |
| Neutralized petroleum sulfonates | 0.8 |
| Cresylic acid | 0.2 |
| | 100.0 |

*Example 2*

| | |
|---|---|
| Insecticidal mineral oil (medium) | 98.0 |
| Neutralized petroleum sulfonates | 1.0 |
| Steam distilled pine oil | 1.0 |
| | 100.0 |

*Example 3*

| | |
|---|---|
| Mineral oil | 99.0 |
| Sulfonates | 0.9 |
| β-naphthol | 0.1 |
| | 100.0 |

*Example 4*

| | |
|---|---|
| Mineral oil | 98.6 |
| Sulfonates | 0.8 |
| Cresylic acid | .1 |
| Pine oil | .5 |
| | 100.0 |

Example 5

| | |
|---|---|
| Mineral oil | 98.6 |
| Sulfonates | 0.8 |
| β-naphthol | 0.1 |
| Benzyl alcohol | 0.5 |
| | 100.0 |

One of the outstanding features of my invention resides in the surprisingly small amounts of additional agents which I have discovered to be amply sufficient in a phytonomic oil to give highly satisfactory tank-mix sprays. While this is of course important in keeping down the cost of materials it is vastly more important in that the phytonomic character of the oil itself is changed but very little if at all.

The contrast in this respect of the foregoing examples with the only hitherto known readily dispersible oils which employed sulfonates (20–40%) is extremely significant.

While, as previously mentioned, up to about 3% of sulfonates may if desired be employed in oils for application as aqueous dispersions to growing vegetation without considerable phytocidal effect I have found in practice that little if any advantage is to be gained by using more than 1.0%. In fact, in some instances, I have actually found that a better deposit of oil is left on the sprayed host when sulfonate is used at 1.0% than when at 3.0%.

Another outstanding feature of my invention resides in the degree of oil-wetting which is obtained. This I have hereinbefore suggested as possibly being due to the fact that a certain proportion of oil is thrown by my preferred compositions into a water-in-oil, invert, emulsion. Just what portion of the oil should go into the conventional oil-in-water emulsion and what portion into water-in-oil emulsion for best over-all results has not yet been determined and probably would be extremely difficult to determine with accuracy. As a very rough estimate it appears that from about 10 to as much as 50% or more of the oil should be in the invert phase.

Still another very important feature of my invention arises from the fact that the operation of my compositions not only is not interfered with when hard water is employed, as is the case with many hitherto employed insecticidal mineral oil compositions, but actually requires that the water possess at least a moderate degree of hardness for best results. Where water of very low hardness is encountered I have found a better oil deposit to result with less absorption by the plant tissues when hard-wall plaster (calcium sulfate), calcium chloride or an equivalent hardness producer is added to the water before the oil composition is dispersed. I prefer hard-wall plaster, because of its ready availability, and add it at the rate of ¼ to ½ pound per 100 gallons of water.

The oil-soluble petroleum sulfonates as marketed are usually in solution in oil and very often contain an appreciable excess of alkali. This may best be neutralized with an oil soluble organic acid such as glacial acetic whereupon the liberated alkali acetate slowly settles out and may be removed by filtration or decantation.

As will readily be understood by those skilled in the art, no particular kind or quality of oil is essential to the operation of my invention, the oil for any particular composition being chosen entirely on its own merits and with regard to the specific use to which it is to be put.

As will be appreciated from the nature of the oil compositions herein described and the tank-mix method of operation for which they are particularly designed they are "emulsible" in the sense that they are emulsified on mere mechanical mixing in water or an aqueous solution containing no emulsifier whatever and such is the construction to be given that term in the appended claims.

Having now described my invention which consists essentially in the combination of certain classes of materials in solution in an insecticidal oil and in the novel dispersions produced therewith and having taught how it may be employed with substantially improved results, what I claim is:

I claim:

1. An emulsible insecticidal oil composition the emulsifying component of which is in solution in the oil and consists of less than 10%, relative to the oil, of petroleum sulfonic salts and an organic, oil-water interfacial tension depressant the molecules of which contain a nonpolar, oil-soluble, hydrocarbon part comprising a six-membered carbocyclic ring and a water-soluble part comprising a metal-free polar group attached to said ring.

2. An emulsible insecticidal oil composition the emulsifying component of which is in solution in the oil and consists of less than 10%, relative to the oil, of an alkali salt of petroleum sulfonic acids and an organic, oil-water, interfacial tension depressant the molecules of which contain a nonpolar, oil-soluble, hydrocarbon part comprising a six-membered carbocyclic ring to which is attached from one to four aliphatic carbon atoms and a polar water-soluble part comprising a metal free oxygen containing group.

3. A phytonomic emulsible insecticidal oil composition the emulsifying component of which is in solution in the oil and consists of less than 3%, relative to the oil, of petroleum sulfonic salts and less than about 2%, relative to the oil, of an organic, oil-water interfacial tension depressant the molecules of which contain a nonpolar, oil-soluble, hydrocarbon part comprising a six-membered carbocyclic ring and a water-soluble part comprising a metal free polar group attached to said ring.

4. A phytonomic emulsible insecticidal oil composition the emulsifying component of which is in solution in the oil and consists of less than 3% relative to the oil, of an alkali salt of petroleum sulfonic acids and less than about 2%, relative to the oil, of an organic, oil-water, interfacial tension depressant the molecules of which contain a nonpolar, oil-soluble, hydrocarbon part comprising a six-membered carbocyclic ring to which is attached from one to four aliphatic carbon atoms and a polar water-soluble part comprising a metal free oxygen containing group.

5. A phytonomic emulsible insecticidal oil composition the emulsifying component of which is in solution in the oil and consists of less than 3%, relative to the oil, of an alkali salt of petroleum sulfonic acids and less than about 2%, relative to the oil, of an organic, oil-water, interfacial tension depressant the molecules of which contain a nonpolar, oil-soluble, hydrocarbon part comprising a six-membered carbocyclic ring to which is attached from one to four aliphatic carbon atoms and a polar water-soluble part comprising an hydroxyl group.

6. A phytonomic emulsible insecticidal oil composition the emulsifying component of which is in solution in the oil and consists of less than 3%, relative to the oil, of petroleum sulfonic salts and less than about 2%, relative to the oil, of an organic, oil-water interfacial tension depressant containing a six membered carbocyclic ring and a polar group and which is selected from the group consisting of cresylic acid, steam distilled pine oil, β-naphthol, thymol, menthol, β-naphthyl-methyl ether, fenchyl alcohol, p-hydroxy diphenyl, benzyl alcohol, xylenol and orcinol.

7. An emulsion spray for insecticidal use comprising the composition of claim 1 and water, said spray having a substantial proportion of the contained oil in a water-in-oil dispersion dispersed in the aqueous continuous phase.

8. An emulsion spray for insecticidal use which comprises the composition of claim 1 dispersed in a hard water.

9. An emulsion spray for insecticidal use which comprises the composition of claim 6 dispersed in a hard water.

WILLIAM HUNTER VOLCK.